United States Patent
Bruffey et al.

(10) Patent No.: US 10,861,099 B2
(45) Date of Patent: Dec. 8, 2020

(54) METHOD AND SYSTEM FOR CONVERTING RESOURCE NEEDS TO SERVICE DESCRIPTIONS

(71) Applicant: ACCURENCE, INC., Louisville, CO (US)

(72) Inventors: Timothy Bruffey, Commerce City, CO (US); Zachary Labrie, Broomfield, CO (US); Jacob Labrie, Longmont, CO (US)

(73) Assignee: ACCURENCE, INC., Louisville, CO (US)

( * ) Notice: Subject to any disclaimer, the term of this patent is extended or adjusted under 35 U.S.C. 154(b) by 0 days.

(21) Appl. No.: 14/968,574

(22) Filed: Dec. 14, 2015

(65) Prior Publication Data

US 2016/0098802 A1 Apr. 7, 2016

Related U.S. Application Data

(63) Continuation-in-part of application No. 14/540,886, filed on Nov. 13, 2014, now Pat. No. 9,721,264, which is a continuation-in-part of application No. 13/542,541, filed on Jul. 5, 2012, now Pat. No. 9,158,869, which is a continuation-in-part of application No. 13/336,559, filed on Dec. 23, 2011, now Pat. No. 8,983,806.

(Continued)

(51) Int. Cl.
| | | |
|---|---|---|
| G06Q 40/08 | (2012.01) | |
| G06Q 10/06 | (2012.01) | |
| G06Q 50/16 | (2012.01) | |
| G06Q 30/02 | (2012.01) | |
| G06F 30/13 | (2020.01) | |

(52) U.S. Cl.
CPC ............ *G06Q 40/08* (2013.01); *G06F 30/13* (2020.01); *G06Q 10/06* (2013.01); *G06Q 10/063* (2013.01); *G06Q 10/063112* (2013.01); *G06Q 30/0201* (2013.01); *G06Q 50/16* (2013.01); *G06Q 50/165* (2013.01)

(58) Field of Classification Search
None
See application file for complete search history.

(56) References Cited

U.S. PATENT DOCUMENTS

| | | | |
|---|---|---|---|
| 5,189,606 A * | 2/1993 | Burns | ................... G06Q 10/06 705/7.12 |
| 5,557,515 A | 9/1996 | Abbruzzese et al. | |

(Continued)

OTHER PUBLICATIONS

U.S. Appl. No. 15/214,877, filed Jul. 20, 2016, Bruffey et al.
(Continued)

*Primary Examiner* — Bijan Mapar
(74) *Attorney, Agent, or Firm* — Sheridan Ross P.C.

(57) ABSTRACT

A communication system and servers are disclosed. The illustrative communication system is taught to include a matching system that has an attribute translation engine and a matching engine that are capable of translating estimate attributes for a work item and contractor attributes into a common format or language, thereby enabling a comparison of the estimate attributes with contractor attributes. This comparison helps to identify qualified or non-qualified contractors to work on the job or work item associated with the estimate attributes.

20 Claims, 7 Drawing Sheets

Related U.S. Application Data

(60) Provisional application No. 61/460,964, filed on Jan. 11, 2011.

(56) References Cited

U.S. PATENT DOCUMENTS

| | | | |
|---|---|---|---|
| 6,037,945 | A | 3/2000 | Loveland |
| 6,810,383 | B1 | 10/2004 | Loveland |
| 6,816,819 | B1 | 11/2004 | Loveland |
| 6,826,539 | B2 | 11/2004 | Loveland |
| 6,829,584 | B2 | 12/2004 | Loveland |
| 6,859,768 | B1 * | 2/2005 | Wakelam ............ G06F 17/5004 703/1 |
| 7,333,944 | B1 * | 2/2008 | Harris .................... G06Q 30/00 705/26.43 |
| 7,389,255 | B2 * | 6/2008 | Formisano ....... G06Q 10/06313 705/7.23 |
| 7,747,460 | B2 * | 6/2010 | Vandrilla ............ G06Q 20/201 705/7.35 |
| 7,844,503 | B2 * | 11/2010 | Fogelson ............... G06Q 30/02 705/26.41 |
| 8,078,436 | B2 | 12/2011 | Pershing et al. |
| 8,145,578 | B2 | 3/2012 | Pershing et al. |
| 8,170,840 | B2 | 5/2012 | Pershing |
| 8,209,152 | B2 | 6/2012 | Pershing |
| 8,249,999 | B2 * | 8/2012 | Dakar ................. G06Q 30/0283 705/1.1 |
| 8,265,963 | B1 | 9/2012 | Hanson et al. |
| 8,401,222 | B2 | 3/2013 | Thornberry et al. |
| 8,670,961 | B2 | 3/2014 | Pershing et al. |
| 8,756,085 | B1 | 6/2014 | Plummer et al. |
| 8,983,806 | B2 | 3/2015 | Labrie et al. |
| 9,158,869 | B2 | 10/2015 | Labrie et al. |
| 9,609,288 | B1 | 3/2017 | Richman et al. |
| 10,204,193 | B2 | 2/2019 | Koger et al. |
| 10,373,256 | B1 | 8/2019 | Allen et al. |
| 2002/0087332 | A1 * | 7/2002 | Como .................... G06Q 10/06 705/1.1 |
| 2004/0243423 | A1 | 12/2004 | Rix et al. |
| 2005/0102394 | A1 | 5/2005 | Loveland |
| 2009/0216552 | A1 | 8/2009 | Watrous |
| 2009/0234690 | A1 | 9/2009 | Nikipelo |
| 2009/0265193 | A1 | 10/2009 | Collins et al. |
| 2010/0235206 | A1 * | 9/2010 | Miller ..................... E04D 3/352 705/7.11 |
| 2010/0332355 | A1 * | 12/2010 | Lopez ................. G06F 17/5004 705/27.1 |
| 2012/0296774 | A1 | 11/2012 | Littooy et al. |
| 2013/0144715 | A1 | 6/2013 | Kranzley et al. |
| 2015/0073864 | A1 | 3/2015 | Labrie et al. |
| 2015/0170288 | A1 | 6/2015 | Harton et al. |
| 2015/0348204 | A1 | 12/2015 | Daues |
| 2016/0307447 | A1 | 10/2016 | Johnson et al. |
| 2017/0132711 | A1 | 5/2017 | Bruffey et al. |
| 2017/0330207 | A1 | 11/2017 | Labrie et al. |
| 2017/0345069 | A1 | 11/2017 | Labrie et al. |

OTHER PUBLICATIONS

Official Action for U.S. Appl. No. 13/336,559, dated Apr. 15, 2014, 9 pages.
Notice of Allowance for U.S. Appl. No. 13/336,559, dated Dec. 5, 2014, 8 pages.
Official Action for U.S. Appl. No. 13/542,541, dated May 23, 2014, 10 pages.
Final Action for U.S. Appl. No. 13/542,541, dated Jan. 28, 2015, 11 pages.
Notice of Allowance for U.S. Appl. No. 13/542,541, dated Aug. 5, 2015, 8 pages.
U.S. Appl. No. 15/445,509, filed Feb. 28, 2017, Labrie.
Notice of Allowance for U.S. Appl. No. 14/540,886, dated Mar. 28, 2017, 10 pages.
U.S. Appl. No. 15/970,484, filed May 3, 2018, Labrie et al.
Official Action for U.S. Appl. No. 15/445,509, dated May 10, 2018, 14 pages.
"ImproveNet's Two-Stage Pricing Wizard Makes It Easy to Calculate Roofing Costs; Dual Views Offer Tradeoffs Between Speed, Precision," Business Wire, 2000, 6 pages.
Official Action for U.S. Appl. No. 15/214,877, dated Mar. 22, 2019, 8 pages.
Notice of Allowance for U.S. Appl. No. 15/445,509, dated Nov. 5, 2018 10 pages.
Official Action for U.S. Appl. No. 15/663,518, dated Dec. 20, 2019 12 pages.
Notice of Allowance for U.S. Appl. No. 15/663,518, dated Apr. 8, 2020 8 pages.
Official Action for U.S. Appl. No. 15/345,071, dated Aug. 22, 2019 8 pages.
Official Action for U.S. Appl. No. 15/345,071, dated Apr. 3, 2020 10 pages.
Official Action for U.S. Appl. No. 15/214,877, dated Sep. 27, 2019 15 pages.
Official Action for U.S. Appl. No. 16/245,506, dated Nov. 29, 2019 9 pages.
Notice of Allowance for U.S. Appl. No. 16/245,506, dated May 28, 2020 8 pages.
Official Action for U.S. Appl. No. 16/208,113, dated Nov. 18, 2019 10 pages.
Notice of Allowance for U.S. Appl. No. 16/208,113, dated May 5, 2020 11 pages.
Corrected Notice of Allowance for U.S. Appl. No. 16/208,113, dated Jul. 2, 2020 7 pages.
Official Action for U.S. Appl. No. 15/606,475, dated Jan. 6, 2020 30 pages.
Official Action for U.S. Appl. No. 15/606,475, dated Mar. 20, 2020 33 pages.
Official Action for U.S. Appl. No. 15/970,484, dated Mar. 19, 2020 25 pages.

* cited by examiner

METHOD AND SYSTEM FOR CONVERTING RESOURCE NEEDS TO SERVICE DESCRIPTIONS

CROSS-REFERENCE TO RELATED APPLICATIONS

This application is a continuation-in-part of U.S. patent application Ser. No. 14/540,886, filed Nov. 13, 2014, which is a continuation-in-part of U.S. patent application Ser. No. 13/542,541, filed Jul. 5, 2012, now U.S. Pat. No. 9,158,869, which is a continuation-in-part of U.S. patent application Ser. No. 13/336,559, filed Dec. 23, 2011, now U.S. Pat. No. 8,983,806, which claims the benefit of U.S. Provisional Patent Application Ser. No. 61/460,964, filed Jan. 11, 2011, the entire disclosures of which are hereby incorporated herein by reference.

FIELD OF THE DISCLOSURE

The present disclosure is generally directed to communication systems and, in particular, toward communication systems that enable jobs to be mapped to contractors in an automated fashion.

BACKGROUND

In the insurance property restoration space for wind and hail claims there is waste. Why does the insured have to waste time trying to find a reputable contractor? Why does both the insurance company and the contractor(s) have to inspect the same property, write an estimate, order the aerial imagery reports, access the same price lists, take the same photos, complete similar forms, etc.? As one can imagine there is a lot of duplication which increases the time frame for which the property can be repaired which may expose the property to secondary damages if the roof or other exterior attributes have been compromised.

At a higher level, each inspector (adjuster and contractor) have to be well versed in the specific art (e.g., wind damage, hail damage, flood damage, etc.) which takes time and energy representing additional waste. The reality is that contractors maintain a database of simplified pricing minimums based on major components for roof replacement that do not correspond with the insurance industry component pricing model. As such this creates a challenge for contractors as they are not able to maintain the knowledge of the insurance processes and software due to storms occurring every few years (it just is not worth paying for the training and licensing to maintain the knowledge or software during the lull periods). So when an event hits in that contractor's area, they are not able to work well within the insurance workflows and as a result they either perform poorly, partner with a "stormer" (contractor who chases storms) who may or may not have long term responsibilities for the property, community, or the business with whom it partners blurring the lines around licensing, insurance, warranties, payment, customer service, and other factors. All of these factors may further lead to challenges for the insured and insurance company and contractor in repairing the home. This leads to homeowners looking towards the carrier for help that is more holistic (not just a check).

Along the same vector, as consumers expect better customer service year over year and insurance companies become more competitive with each other, there is a growing demand to provide a more comprehensive solution which extends beyond coverage determination and an indemnity payment. Carriers and insureds are looking for ways to repair the home efficiently after verified damages. Contractors are also looking for ways to participate in a workflow with what is traditionally referred to as Managed Repair.

DETAILED DESCRIPTION

Figure 1:
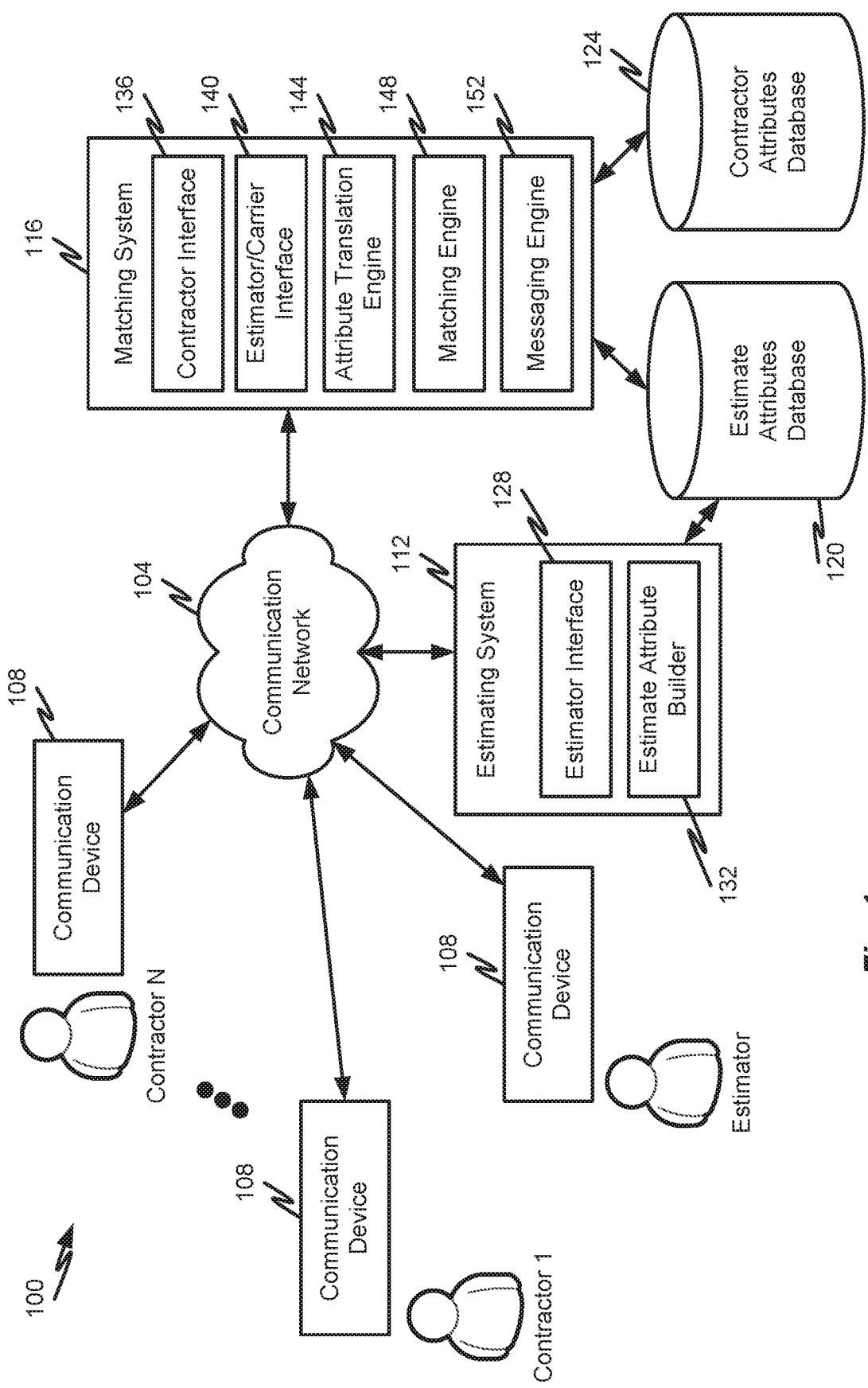
FIG. 1 depicts a block diagram of a communication system in accordance with at least some embodiments of the present disclosure.

Embodiments of the present disclosure will be described in connection with the execution of a matching system. While embodiments of the present disclosure will be described in connection with the matching of a contractor to a job or project, where the job or project corresponds to a job or project to be performed on behalf of an insured, it should be appreciated that embodiments of the present disclosure are not so limited. Indeed, the aspects disclosed herein can apply to any type of data translation and matching process where one of the parties to be matched provides attributes or inputs in a first format, the other of the parties to be matched provides attributes or inputs in a second format, and there is a translation from the first format to the second format, or vice versa, or from the first and second formats to a third-common format, that enables the parties to be matched according to their attributes or inputs. For instance, embodiments of the present disclosure can be applied to any workflow processing environment of any size or complexity. As a more specific, but non-limiting example, the features described herein can be applied to any project assignment process such as a residential construction project, a commercial construction project, a word-processing project, a data-input project, or the like.

With specific reference to the situation of an insured claiming damages on their house due to wind, fire, hail, flooding, etc., the existence of Managed Repair programs can become useful. Managed Repair programs can be successful with highly controlled situations. For example, when a hose on the washer bursts causing a water loss in the basement of an insured's property, no one knows except the insured. There are EPA and other standards that are accepted by the industry with respect to the activities required to remove the water damage from the property. Water losses account for approximately 35% of insurance claims and they are generally kept private.

Contrast this with a hail storm. It is on the news, everyone in the neighborhood knows and is affected, specialized weather mapping services specific to hail events can be subscribed to by contractors, and as such "stormers" and anyone with a ladder and a truck can become a roofer or subcontractor and begin soliciting business. Furthermore, though there are some areas with building codes in the roofing construction space, there are no set standards of practice of when to repair or a replace a roof that are industry wide. Each carrier has different standards and adjusters have the ability to negotiation based on situational information.

The activities associated with repairing a water loss versus a roofing loss vary in scale as the average indemnity is $2,731 versus $8,188 and in material. The ordering of roofing versus flooring materials is much more complicated requiring specialized equipment, personnel, lines of credit, etc.

Because the roofing insurance events are much more uncontrolled as compared to water damage events, it becomes vastly more difficult for an insurance company to effectuate a Managed Repair program for roof damage as compared to flood damage. The homeowner is going to call in a loss with a contractor who knocked on their door to help start the claim process 30% of the time, and the contractor is going to have pre-sold material details to the insured to help them expect results and seek the repair with that contractor. That makes it difficult for the carrier to maintain a program which would slow down the repair process in the eyes of those insureds. Additionally, the lack of standardization becomes a challenge in that the estimate practices drive profitability and with no industry standards, contractors are not able to understand if they can perform services for the program profitably. As a result, contractors look for items the carrier missed and try to include them or they attempt to upgrade services to the insured (which are not covered by the indemnity check), or cut corners during the repair process. Any of these three items will cause friction in the insurance Managed Repair program because they either make the insurance company look bad (missing things) or not paying for things (upgrades), or the contractor looks bad (cutting corners) which can lead to roofing system problems and the carrier removing the contractor from the program and losing money and expensive secondary repairs.

All of these issues also cause the insured to call the adjuster or agent who recommended the program and complain or ask questions. The agent and adjuster are busy and get nothing out of recommending a Managed Repair program. As such, if that program causes any strife in their workflows, or increases their call volume, etc., they stop recommending the program. This of course reduces the volume of leads going into the program. When leads go down, the contractors have fewer claims to amortize their expenses across (associated with the program; some have annual licenses, or built in discounts, etc.) and this causes them to do the three aforementioned items more regularly (find more damages, upgrade, or cut corners), causing a vicious circle which slowly cuts off more leads to the program due to the agents and adjusters opting out until in many situations the corporate offices of the carrier shut down the program or stop using that portion of the program (roofing).

Lastly, there is one more unique problem with roofing Managed Repair. Today there are manufacturers who maintain and promote a network of certified roofing contractors. To maintain the membership with manufacturers and have this positive status, the contractor must sell warranties and install that manufactures' materials and or systems. These systems and shingles are many times more expensive then insurance pricing. As such, by doing insurance work the contractor is less able to qualify for the certification by the manufacturer and is, therefore, in large part at direct odds with insurance Managed Repair programs. Water Managed Repair does not face these issues and are highly successful as a result.

It is, therefore, an aspect of the present disclosure to solve or greatly improve all of these problems for the roofing segment of Managed Repair along with any other complex Managed Repair programs.

In accordance with embodiments of the present disclosure, prior to a matching system being utilized on a specific address, a database of contractors with elements can be maintained that is accessible to the matching system or part of the matching system. The database can be loaded by partner (e.g. roofing manufacturer, Managed Repair contractor, contractor at large, etc.) or some other entity. The database contains among other things, by contractor, required elements such as a price per square foot for different grades of material (e.g. 30 year, 40 year, lifetime, etc.) of installed material in a basket of goods that is considered standard work (e.g. remove felt, waste, nails, caps, remove top layer of shingles, remove metals, install felt, install shingles, install new metals, disposal for said items, all work up to a slope of $10/12$, etc.) as well as pricing by specified unit of non-standard work (e.g. ice and water shield, decking, steep $10/12+$, etc.) as well as optional elements which may include their service types, certifications, experience, team size, schedule, average project size, customer feedback scores, insurance carrier feedback scores, Managed Repair programs for whom they work, etc.

When an adjuster arrives onsite to settle a loss, the adjuster may utilize the following technologies: (i) a pricing system which has standardized labor and pricing database coupled with an estimating application; (ii) an aerial CAD imagery report of the roof. When the adjuster completes their workflow as-is today, their work product includes an estimate that incorporates numbers one and two above.

In some embodiments, the matching system proposed herein then connects to the estimating platform's online component and extracts the estimate data and potentially the CAD data, photos, location attributes, and other project elements. The matching system then parses the data into a specific format that can be used in the process of translating the data to contractor attributes (or vice versa), thereby facilitating a matching between the contractor and the project that was just estimated by the adjuster. Based on the parsing and translating, embodiments of the present disclosure can then group the estimate data into program and non-program work and further group the program work into standard and non-standard work.

In some embodiments, the matching system disclosed herein is capable of analyzing the price per square for the program work standard basket of goods and the program work non-standard items pricing. In some embodiments, the matching system can further analyze the loss type, materials, and situational components to understand the project requirements by skill level for a contractor. The matching system can further analyze the carrier or other customer type, the "Customer" requirements for the managed repair program which may include contractors, loss types, estimate dollar values, response time, and other attributes.

Thereafter and in accordance with at least some embodiments, the matching system may then analyze whether or not there exists a contractor in the database that matches the Customer Managed Repair requirements as determined above. To be a qualified match, the price per square for the basket of goods and the other characteristics should match for that zip code. In some embodiments, the matching system may perform a look up for each variable and give each variable a pass or fail rating which is rolled into an aggregated rating showing the quality of the match. Based on the Customer specifications, the quality of the match may be accepted by the matching system automatically or presented to the Customer for ultimate acceptance.

In some embodiments, when the matching system finds a match between a contractor and the job being estimated, the matching system may be configured to notify the Customer, the insured, the adjuster, and/or the contractor. The notification may be in the form of one or more of: transmitting emails, initiate a call (e.g., a conference call between the Customer and the contractor), send data through a system, etc. Documentation may also be included in the notification and may be standardized to include the requirements as set by any stakeholder.

This matching system creates an efficiency for all stakeholders by automatically translating the adjuster estimate into a understood pricing model used by contractors without either the contractor or the adjuster having to understand the differences with component-based estimating versus price per square estimating or each carrier's claim settlement guidelines and further qualifying that a contractor in that market will accept the tasks associated with the repair of the property without necessitating a site visit for the contractor.

This system generates qualified, real leads, backed by inspection data that is transferred to the appropriate party without much of the duplication in data collection and associated costs. In some embodiments, this would allow the adjuster to complete their estimate and within moments provide the insured with one or many qualified contractors who will perform the services for the specified price (indemnity payment under the insurance contract between the policyholder and the insurance carrier). Even if the insured already has a contractor, they can use these as backups or compare them to replace their existing contractor if desired.

With respect to the insurance company, the company is able to effortlessly provide a more holistic solution to the insured while still giving them freedom to use whomever they see fit. Further, as an insurance company, the evidence that there are other contractors in the market who will perform the services at the specified price puts downward pressure on the contractor that is not part of the program if they request more money for the same services eliminating waste in the current system.

With reference now to FIGS. 1-7, various examples or features capable of deploying a matching system will be described in accordance with at least some embodiments of the present disclosure. The following description is not intended to limit the claims to any particular embodiment described in connection with a particular figure. To the contrary, elements from any of the figures may be combined with other elements from other figures to provide a functional and efficient matching system. For instance, the features of FIG. 1, 2 or 3 may be adapted to perform some or all of the methods described in any of FIGS. 4-7.

With reference initially to FIG. 1, an illustrative communication system 100 will be described in accordance with at least some embodiments of the present disclosure. The communication system 100 of FIG. 1 may be a distributed system and, in some embodiments, comprises a communication network 104 connecting one or more communication devices 108 to an estimating system 112 and/or a matching system 116. In some embodiments, the estimating system 112 and matching system 116 may be implemented in a common entity and may reside in a common enterprise network (e.g., behind a common firewall). In other embodiments, the systems 112, 116 may be implemented by different entities and/or at different enterprise networks. In some embodiments, the estimating system 112 and matching system 116 may be implemented on a common server and that particular server may have some or all of the components of both the estimating system 112 and matching system 116. The depiction of the estimating system 112 as being separate from the matching system 116 is for illustrative purposes only and should not be construed as limiting the communication system to any particular configuration.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

The communication devices 108 may correspond to customer/insureds' communication devices, contractor communication devices, estimator communication devices, insurance company communication devices, or the like. In accordance with at least some embodiments of the present disclosure, the communication devices 108 may comprise any type of known communication equipment or collection of communication equipment. Examples of a suitable communication device 108 include, but are not limited to, a personal computer, laptop, tablet, cellular phone, smartphone, telephone, or combinations thereof. In general, each communication device 108 may be adapted to support video, audio, text, and/or data communications with other communication devices 108 as well as the systems 112, 116 depicted in FIG. 1. The type of physical medium used by the communication device 108 to establish a communication channel or multiple communication channels with systems 112, 116 may depend upon the capabilities of the communication device 108, the capabilities of the systems 112, 116, the type of network 104 connecting the communication device(s) 108 with the systems 112, 116, etc. It should be appreciated that any media type may be used to exchange network-connected devices.

The estimating system 112 may be implemented on a server or collection of servers. The estimating system 112 is shown to include an estimator interface 128 and an estimate attribute builder 132. The estimating system 112 is further shown to have connectivity to an estimate attributes database 120.

In some embodiments, the estimator interface 128 may correspond to one or a plurality of dialogs, webpages (e.g., HTML pages), scripts (e.g., XML), or the like that are deliverable to an estimator's communication device 108. When presented with the estimator interface 128, the estimator may input various types of information about a property and the scope of work to be performed on that property. The data input by the estimator during this estimation process may be referred to as estimate attributes. In some embodiments, the estimator may be provided with a script or workflow in which the estimator responds with various answers to questions. As the estimator answers questions on his/her communication device 108, those answers are provided to the estimate attribute builder 132 to generate an estimate of the overall material and/or labor requirements to complete the particular job being estimated. As the estimate builder 132 builds these estimate attributes, the estimate attributes may be input into the estimate attributes database 120 as one or more data entries.

The estimate attributes database 120 may correspond to any type of hierarchical or non-hierarchical database in which one or a plurality of data sets may be stored. The estimating system 112 may comprise a database interface specific to the database 120 type that enables the estimating system 112 to input data into the database 120 and retrieve data from the database 120. In some embodiments, the database 120 may correspond to a SQL or non-SQL database. In other embodiments, the database 120 may corresponds to a link-list database, a graph database, or any other type of database 120. As data is input into the database 120 by the estimating system 120, an index of the input data may be updated within the estimate attributes database 120 or at any interfaces to the database.

The matching system 116 is similar to the estimating system 112 in that the matching system 116 may also be connected to one or more databases. In particular, the matching system 116 is shown has having connectivity to the estimate attributes database 120 as well as a contractor attributes database 124. The matching system 116 may comprise one or multiple database interfaces, again specific to the database 120, 124 type.

The matching system 116 is also shown to include a contractor interface 136, an estimator/carrier interface 140, an attribute translation engine 144, a matching engine 148, and a messaging engine 152. The contractor interface 136 and estimator/carrier interface 140 may be similar to the estimator interface 128 in that the interfaces 136, 140 may present information to communication devices 108 and receive responses back from the communication devices 108. Again, the types of technologies that may be used for these interfaces 136, 140 include, without limitation, dialogs, webpages (e.g., HTML pages), scripts (e.g., XML), or the like that are deliverable to a communication device 108. The contractor interface 136 may correspond to a particular interface for contractors whereas the estimator/carrier interface 140 may correspond to a particular interface for estimators or contractors. A customer may also have access to the estimator/carrier interface 140 or to a different interface (e.g., a customer interface).

The attribute translation engine 144 may correspond to one or more instruction sets that enable the matching system 116 (or a microprocessor thereof) to translate attributes of one type to attributes of another type. More specifically, the attribute translation engine 144 may provide the matching system 116 with the capability to translate a basket of goods or estimate attributes input by an estimator into a price per square foot estimate (or some other estimate type used by contractors) for completing a project associated with the basket of goods. The price per square foot estimate can be compared to contractor attributes input by contractors into the contractor attributes database 124 through the contractor interface 136.

Once estimate attributes have been translated into a common attribute type or language as the contractor attributes, the matching engine 148 may then perform a comparison or matching process whereby contractors are determined to be qualified or not qualified for the job based on whether or not the contractor attributes meet particular performance or pricing requirements. If the matching engine 148 finds one or more qualified contractors for a particular project, then the messaging engine 152 may be used to provide appropriate messaging to the customer/insured, the estimator, the insurance carrier, the qualified contractor(s), and/or the unqualified contractor(s). The messaging engine 152 may generate customize messages or notifications for each interested party depending upon their role, rules, and whether or not a qualified contractor was identified. For instance, a qualified contractor may be notified of a new job for which they have qualified and an indication that they have been selected to complete said job, whereas an unqualified contractor may be notified that they did not qualify for a particular job along with a reason why they did not qualify (e.g., bid was too expensive, customer had their own contractor, work was outside their defined region, etc.).

Figure 2:
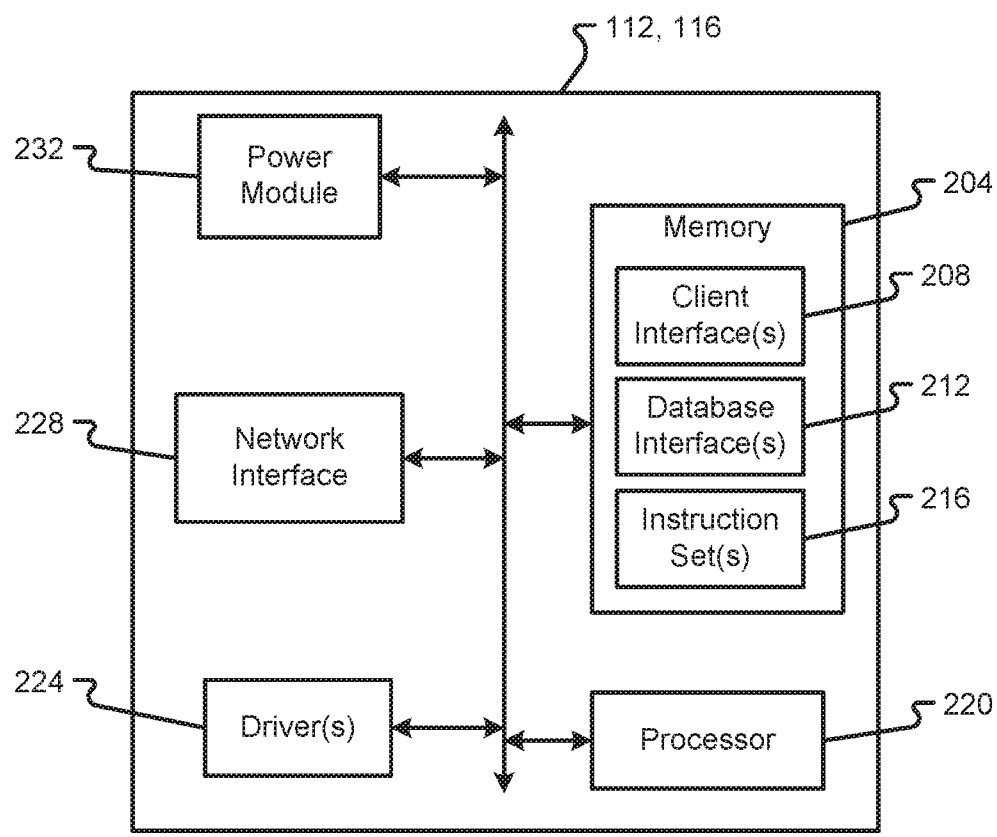
FIG. 2 is a block diagram depicting components of a server used in a communication system in accordance with at least some embodiments of the present disclosure.

With reference now to FIG. 2, additional details of the estimating system 112 and/or matching system 116 as implemented by one or many servers will be described in accordance with at least some embodiments of the present disclosure. The system 112, 116 is shown to include computer memory 204 that stores one or more instructions sets, applications, or modules, potentially in the form of client interface(s) 208, database interface(s) 212, and other instruction set(s) 216. The system 112, 116 is also shown to include a processor 220, one or more drivers 224, a network interface 228, and a power module 232.

The memory 204 may correspond to any type of non-transitory computer-readable medium. In some embodiments, the memory 204 may comprise volatile or non-volatile memory and a controller for the same. Non-limiting examples of memory 204 that may be utilized in the reader 108 include RAM, ROM, buffer memory, flash memory, solid-state memory, or variants thereof. Any of these memory types may be considered non-transitory computer memory devices even though the data stored thereby can be changed one or more times.

The applications/instructions 208, 212, 216 may correspond to any type of computer-readable instructions storable in memory 204. The client interface(s) 208 may correspond to a generic version of the various types of communication device interfaces depicted in FIG. 1. In particular, an estimator interface 128, a contractor interface 136, and/or an estimator/carrier interface 140 may each be referred to as a client interface 208 due to their ability to interface the server with a client/communication device 108.

Similarly, the database interface(s) 212 may correspond to any type of database interface that provides connectivity between the server and either the estimate attributes database 120 and/or the contractor attributes database 124. The database interface(s) 212 may be specific to the type of database with which the server communicates or they database interface may be generic to any type or multiple types of databases.

The instruction set(s) 216 may include one or more of the applications 132, 144, 148, and/or 152 depicted in the systems 112 and/or 116. In particular, the instruction set(s) 216 may correspond to computer-readable instructions that are executable by the processor 220 and, when executed, facilitate the server or system 112, 116 to provide the functionality associated with those instruction set(s) 216. As a non-limiting example, the matching engine 148 may correspond to a particular set of instructions 216 that enables the server or matching system 112, 116 to perform a process that matches a project or estimated work item with one or more contractors after the estimate attributes have been translated into a common language or attribute type as the contractor attributes.

FIG. 2 is illustrative for purposes of showing a single server implementing all of the possible functions described in connection with FIG. 1. It should be appreciated that a server may implement only a subset of the applications/instruction sets stored in memory 204.

The processor 220 may correspond to one or many microprocessors that are contained within a common housing or blade with the memory 204. The processor 220 may be a multipurpose, programmable device that accepts digital data as input, processes the digital data according to instructions stored in its internal memory, and provides results as output. The processor 220 may implement sequential digital logic as it has internal memory. As with most known microprocessors, the processor 220 may operate on numbers and symbols represented in the binary numeral system.

The driver(s) 224 may correspond to hardware, software, and/or controllers that provide specific instructions to hardware components of the server thereby facilitating their operation. For instance, the network interface 228 and/or memory 204 may each have a dedicated driver 224 that provides appropriate control signals to effect their operation. The driver(s) 224 may also comprise the software or logic circuits that ensure the various hardware components are controlled appropriately and in accordance with desired protocols. For instance, the driver 224 of the network interface 228 may be adapted to ensure that the network interface 228 follows the appropriate network communication protocols (e.g., TCP/IP (at one or more layers in the OSI model), UDP, RTP, GSM, LTE, Wi-Fi, etc.) such that the network interface 228 can exchange communications via the communication network 104. As can be appreciated, the driver(s) 224 may also be configured to control wired hardware components (e.g., a USB driver, an Ethernet driver, fiber optic communications, etc.).

The network interface 228 may comprise hardware that facilitates communications with other communication devices over the communication network 104. As mentioned above, the network interface 228 may include an Ethernet port, a Wi-Fi card, a Network Interface Card (NIC), a cellular interface (e.g., antenna, filters, and associated circuitry), or the like. The network interface 228 may be configured to facilitate a connection between the server and the communication network 104 and may further be configured to encode and decode communications (e.g., packets) according to a protocol utilized by the communication network 104.

The power module 232 may include a built-in power supply (e.g., battery) and/or a power converter that facilitates the conversion of externally-supplied AC power into DC power that is used to power the various components of the server. In some embodiments, the power module 232 may also include some implementation of surge protection circuitry to protect the components of the server from power surges.

Figure 3:
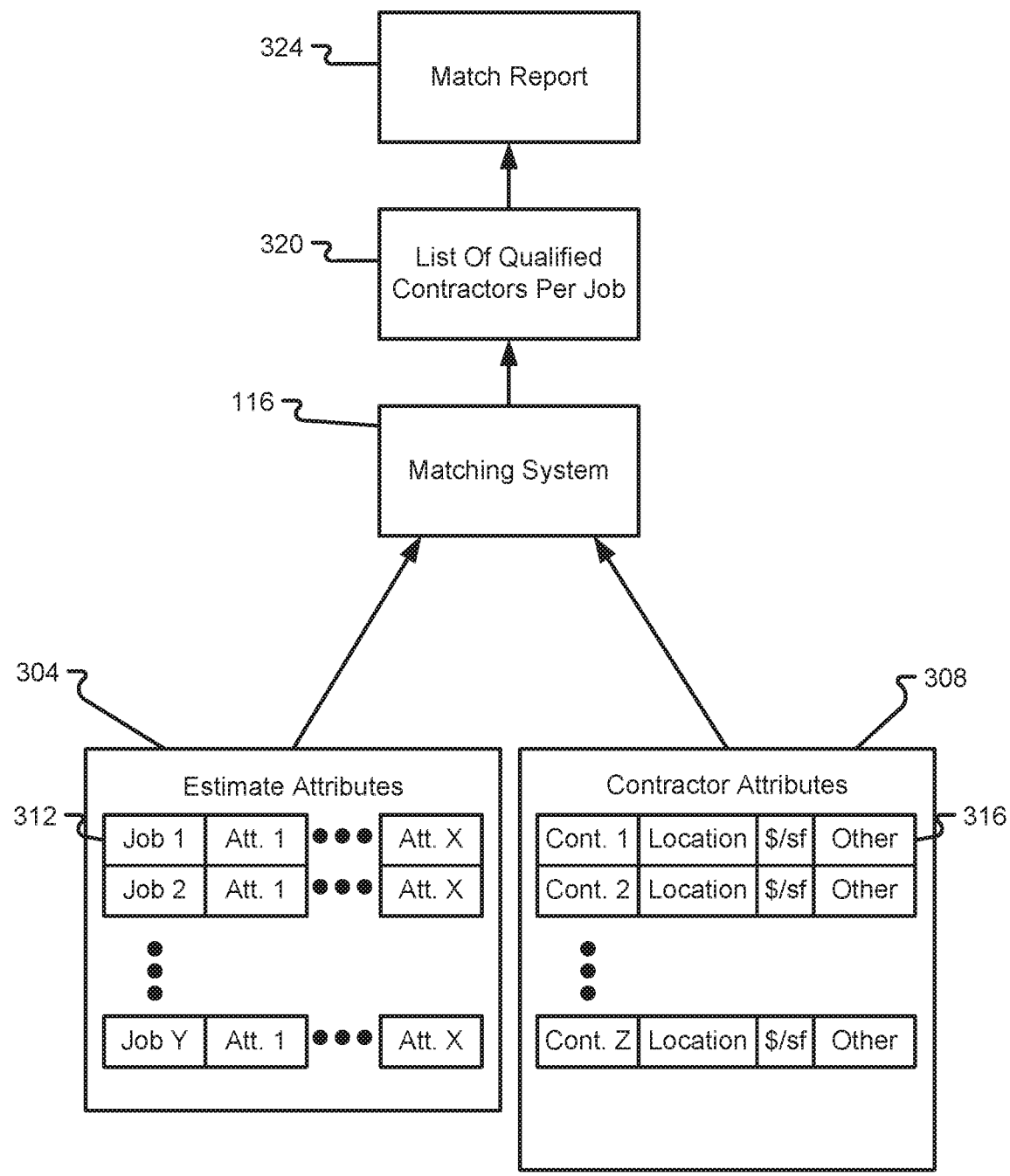
FIG. 3 is a block diagram depicting a matching system and its operation in accordance with at least some embodiments of the present disclosure.

With reference now to FIG. 3, additional functionality of the matching system 116 will be described in accordance with at least some embodiments of the present disclosure. The matching system 116 is shown to have access to estimate attributes 304 and contractor attributes 308, which may be stored in an estimate attribute database 120 and contractor attribute database 124, respectively. The estimate attributes 304 are shown to include a plurality of data sets 312, where each data set 312 corresponds to a different job which has had its scope estimated by an estimator and/or the estimating system 112. In the depicted embodiment, up to Y data sets 312 are shown, where Y is an integer that is greater than or equal to one. Each data set is shown to include a job or estimate identifier (e.g., the first field) and a plurality of associated attributes (e.g., X attributes where X is an integer greater than or equal to one). The number of fields in one data set 312 does not necessarily have to equal the number of fields in another data set.

The contractor attributes 308 are also shown to include a plurality of data sets 316, where each data set 316 corresponds to a different contractor's bid for a particular type of work or basket of goods. In some embodiments, a single contractor may have multiple bids or data sets 316 contained within the contractor attributes 308. In some embodiments, a single data set 316 may comprise each of the different bids for different baskets of goods made by a single contractor. In some embodiments, a single contractor may provide only a single bid for a single basket of goods. As shown in FIG. 3, the types of information that may be contained within the fields of a contractor's data set 316 include a contractor identifier, a location field, a price per square foot bid (or some other aggregate bid for a collection of items in a basket of goods), and other data fields. The type of information that may be contained in the other data fields include an identifier of the type of basket of goods for which the bid is made, a preference for work, a list of references, a list of previous work done in connection with the matching system 116, notification preferences (e.g., email contacts, phone numbers, etc.), and other information particular to a contractor or a contractor's bid.

In addition to having access to the attributes 304, 308, the matching system 116 may also have access to insurance carrier configuration options. Examples of the data that may be included in the carrier configuration options include, without limitation, locations where the automated matching program described herein is offered, the indemnity minimum value for which the program will be reviewed, the peril or loss type that for which they want to offer the program, the contractors which they will accept into the program, the basket of goods (e.g., repair item sets) that they want to be calculated to determine a match, the holistic nature of the services in comparison to the estimate (e.g., the percentage of line items offered by the contractor on the estimate), the difference in price per square for the basket of goods associated with the original estimate, the average number of instances of changes to an estimate or additional items per job for that specific TPA or contractor, the distance from the property that the closest contractor is, the number of days prior to starting the services that the contractor has committed to in the program, the number of hours that the contractor has committed to contacting the insured from receiving the job information, if the peril and estimate used certain technologies (e.g. aerial CAD measurements), if the estimate was written by a certain group within the carrier (e.g. field adjuster, desk adjuster, independent adjuster, etc.), the warranty that the contractor or third parties provide to the insured without any added fees, the discount for which the contractor provides to the carrier associated with the claim matching program if any, contractor credentials, licensing, manufacturer certifications, OSHA ratings, insurance, etc. The matching system 116 may also utilize its translation engine 144 to scrub the incoming estimate information and tease out a quality issue (e.g. contractors may not want to do work if the overall quality of the estimate is cutting corners, etc.).

When an estimate is created by the estimating system 112, the estimate attributes may be input into the database 120. The matching system 116 may then parse the data contained in the estimate attributes 304 to match the estimate with one or more qualified contractors. In some embodiments, the information that may be parsed from the estimate attributes 304 or from the data set 312 includes, without limitation, market or location for the project (e.g., metro-level, zip code, state, county, etc.), estimating price utilized by the estimator, month for the price estimate, claim number for the estimate, insurance carrier for the estimate, note of whether the estimator is a staff member or third party (e.g., independent adjuster) of the insurance carrier, note of estimate quality based on certain attributes, etc.

The attributes that may be analyzed to determine estimate quality include, without limitation, indication to replace roof but not plastic turtle vents (which would likely have been damaged by hail), replacement of items without paying to remove items (e.g., cutting corners by the carrier), amount of waste applied to a material type by the carrier based on the roof system (e.g., laminate shingle on a hip roof receiving 10% waste instead of 15% waste), total material quantities (e.g., linear feet, squares, other units) specifying the total number of squares for the roof system, siding, etc., material type (e.g., 3tab laminate shingles, wood shakes, laminate lifetime dimensional shingles, etc.), dumpster size and quantity allowed for disposal for roofing and elevations and interior, total value allotted for dumpsters, tear off value of shingles and roofing materials, felt value for roofing system, installation value, hip and ridge value, gutter apron value, drip edge value, ventilation value, valley metals value, steep tear off value, steep install value, steep pitch in quantities for system, permit fees, starter shingles, ice and water shield membrane, roofing labor hours, roofing labor dollars, notes, structures (e.g., multiple, sheds, detached garage, etc.), skylight dollars, skylight flashings, satellites, chimney flashings each, chimney flashings dollars, chimney chase each, 301b felt quantity, 301b felt dollars, higher charge (e.g., installation of materials on a surface above two stories or various levels, 2+ 3+ etc.), extra layers of roof to be removed (e.g., multiple layers of shingles or shakes under the primary material layer), extra layer removal dollars, 14" flashing, re-decking squares, re-decking dollars, total roof level item dollars for standard program items, and/or total roof level item dollars by non-standard program items.

In some embodiments, the matching system 116 analyzes the total roof level item dollars for standard program item and any of the other attributes identified above and calculates a price per square for the items included in the standard basket of goods as defined by the configuration (e.g. roof felt, roof shingles, tear off, disposal, vents, flashings, valley metals, hip and ridge material (standard), etc.) and based on the number of squares that the roof system has. These baskets of goods may be driven by the primary material type. Examples of primary material types that may be used to define a particular basket of goods and their associated costs include, without limitation, 3-Tab shingle basket of goods, laminate shingle 30 year basket of goods, laminate shingle 40 year basket of goods, laminate shingle 50 year basket of goods, laminate shingle lifetime basket of goods, wood shake basket of goods, etc. In other words, multiple different basket types may be supported from an estimating standpoint and each of those baskets may be bid on a price per square foot basis by contractors.

The matching system 116 may also determine the price per applicable unit for the non-standard items (e.g. IWS, steep levels, etc.). In some embodiments, the matching system 116 now knows the price per square for that basket of goods and references contractor attributes 308 in the contractor attributes database 124 to determine whether any contractors are qualified to service the loss based on their entered minimums for that specific basket of goods as well as if they service the loss address.

For example, if there are six contractors in the system that service the loss area with the following make up: $262.17 Price per square from the carrier estimate for a 30 Year Laminate Basket of Goods. Then each contractor will be qualified or disqualified based on their input price per square within their associated 30 Year Laminate attribute:

$275 Contractor A: disqualified as price per square minimum is too low $302 Contractor B: disqualified as price per square minimum is too low $260 Contractor C: qualified $250 Contractor D: qualified $255 Contractor E: qualified $255 Contractor F: qualified It should be noted that is not a bidding system as the contractors input their attributes without any further information about the project. Rather, the matching system 116 is looking for qualified contractors and the matching system 116 is delivering qualified pricing for a basket of goods in a market by specific contractors. The matching system 116 uses this information to generate a list of qualified contractors for the estimated job (which would include contractors C-F identified above). These qualified contractors may correspond to those contractors that are both qualified and willing to perform the adjustor's estimate.

A match report 324 may then be constructed by the matching system 116. The match report 324 may include some or all of the qualified contractors identified in the list of contractors 320. This report may be distributed to the insured, the estimator, the carrier, and/or the contractors (e.g., qualified and/or unqualified contractors) via appropriate notification or messaging systems.

With the data in the match report 324, the insured and/or estimator have knowledge that there are contractors that are willing to perform the services at the estimate that was generated by the adjuster. This is valuable information because the carrier is trying to settle the loss at a fair market price. The carrier can use these data points that show that the "settlement" is reasonable for the incurred loss and the associated repairs. In some embodiments, the contractors may be organized or prioritized on the match report 324 based on one or more factors. For instance, qualified contractors could be prioritized on the match report 324 according to the percentage of the scope of work they can complete (e.g., where one contractor can complete multiple baskets of goods for an estimate whereas another contractor can only complete some of the baskets of goods for an estimate, there contractor capable of completing the multiple baskets may be given a higher priority in the match report 324). There may even be logic that prioritizes or organized based on whether a contractor provides a conditional bid (e.g., a contractor saying they will only do gutters if they also get roof may be given a lower priority as compared to a contractor that is willing to do either or both baskets of goods (gutter and roof) without condition). Another prioritization factor may include a warranty level. In this situation, the contractor providing a higher/longer warranty may be prioritized as compared to other contractors. Finally, the contractors can be filtered and/or matched in the match report 324 based on supplemental posts to the initial job. Said another way, a contractor that changes their attributes multiple times may be given a lower priority than other contractors that do not change attributes, or vice versa.

In some embodiments, contractors may be further enabled to update their basket of good pricing at any time and the carrier can update their basket of good items at any time. When the carrier updates their pricing for a basket of goods (basket of goods may be regional; a carrier may have different baskets for different areas or so could the contractor), the matching system 116 may generate an automated notice to the contractors to address their associated pricing for the basket of goods. Until the contractor has reviewed the change by a carrier to their basket of goods, that contractor's price per square could be noted as "un-verified" in the match report 324.

Figure 4:
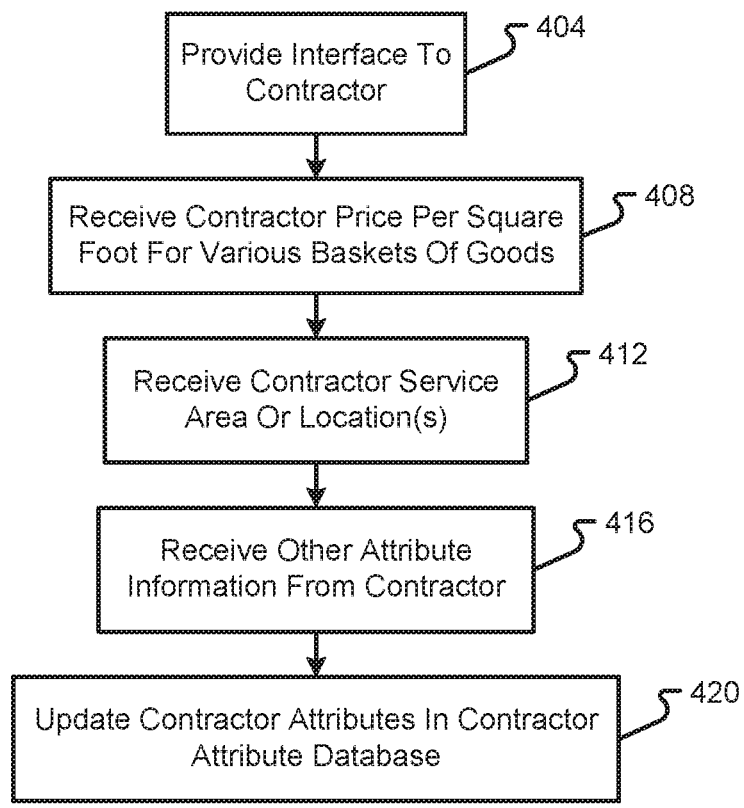
FIG. 4 is a flow diagram depicting a method of updating contractor attributes in a contractor attribute database in accordance with at least some embodiments of the present disclosure.

With reference now to FIG. 4, additional details of a method for updating contractor attributes in a contractor attribute database will be described in accordance with at least some embodiments of the present disclosure. The method begins by providing a contractor interface 136 to a contractor via their communication device 108. This interface 136 may be provided via a webpage, an application interface, a Virtual Private Network (VPN) connection, or the like.

Via this interface 136, the matching system 116 receives the contractor's pricing for various baskets of goods on a per-square basis (step 408). This information can be input into the contractor attributes 308 or a data set 316 particular to that contractor and further particular to that basket of goods (e.g., laminate shingle 30 year basket of goods).

The matching system 116 may further receive contractor service areas or locations (step 412). This information may identify locations or areas in which the contractor is willing/able to provide service within a specified time frame (e.g., within a day or two days), areas in which the contractor is situated and regularly provides service, areas in which the contractor is unable to provide service, etc.

The method may continue by receiving other attribute information from the contractor or from a carrier with respect to a contractor (step 416). The types of information that may be received in addition to the location information and pricing information include basic warranty information, years in service information, PUC license numbers, quality history, and any other information that indicates whether the contractor is qualified or unqualified to perform any type of work. It should be appreciated that one estimate may contain multiple baskets of goods without departing from the scope of the present disclosure. Furthermore, the baskets of goods do not necessarily need to be priced on a per-square basis; rather, embodiments of the present disclosure contemplate other forms of pricing such as per-linear measurement or other measurements.

Based on the information received via the contractor interface 136, the matching system 116 may update the contractor attributes 308 in the contractor attribute database 124. In some embodiments, a database interface 212 may be used to perform this particular update.

Figure 5:
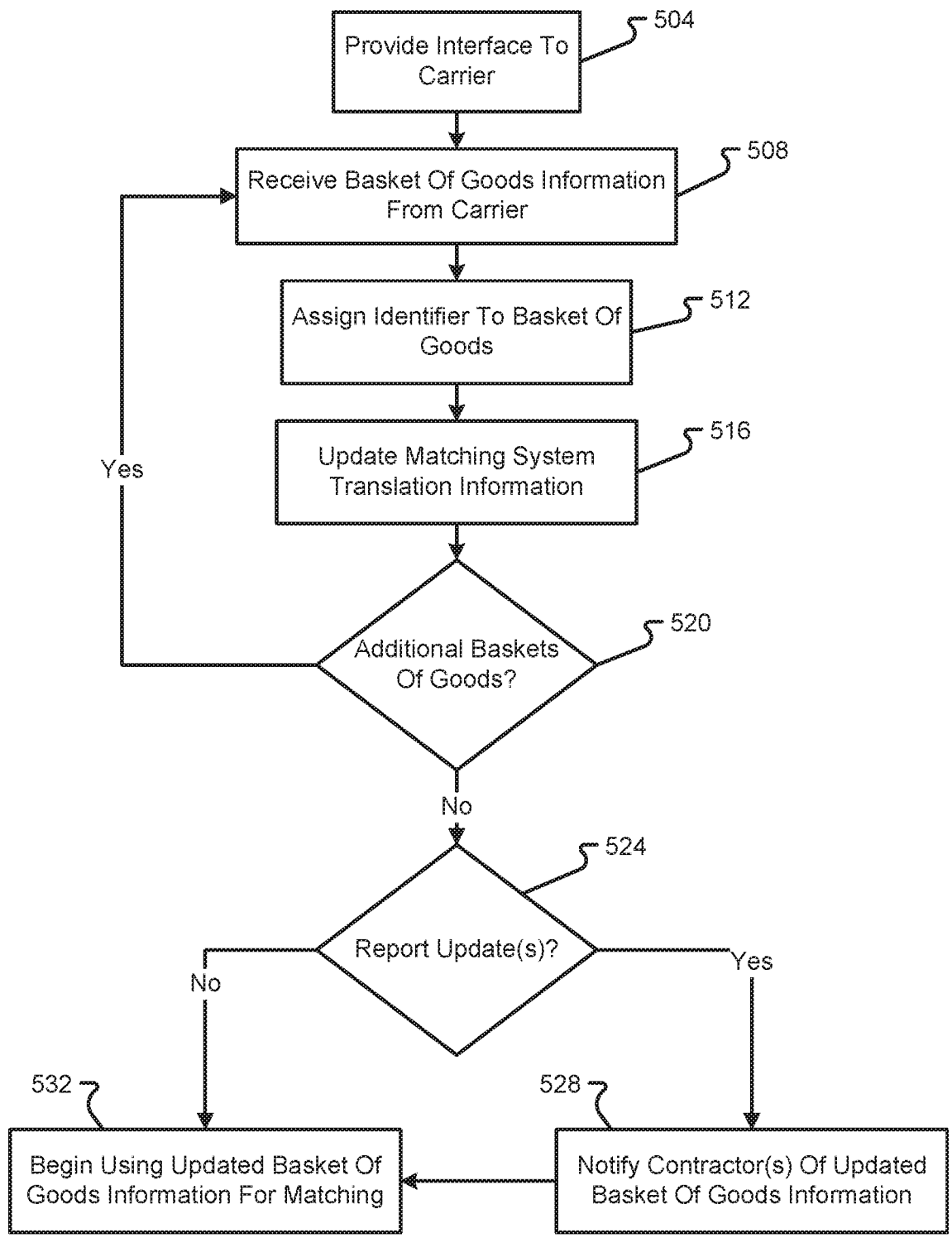
FIG. 5 is a flow diagram depicting a method of updating a matching system in accordance with at least some embodiments of the present disclosure.

With reference now to FIG. 5, details of a method for updating a matching system 116 will be described in accordance with at least some embodiments of the present disclosure. The method begins by providing an interface 140 to the insurance carrier (step 504). Via this interface 140, the carrier is able to provide basket of goods information and associated restrictions, included standard or non-standard items, permissible pricings, etc. to the matching system 116 (step 508). When this basket of goods information is received, the carrier may also provide an identifier for the basket of goods or the matching system 116 may assign one thereto. Examples of basket of goods identifiers that may be used for roofing baskets of goods include, without limitation, 3-Tab shingle basket of goods, laminate shingle 30 year basket of goods, laminate shingle 40 year basket of goods, laminate shingle 50 year basket of goods, laminate shingle lifetime basket of goods, wood shake basket of goods, etc.

The matching system 116 then updates the information used by the matching engine 148 to translate estimate attributes 304 to contractor attributes 308 or vice versa (step 516). The process then continues by determining whether there are any additional baskets of goods to be input or updated by the carrier (step 520). If this query is answered positively, then the method returns to step 508. If the query is answered negatively, then the method proceeds to step 524 where it is determined whether or not to report the basket of goods updates.

If the query of step 524 is answered positively, then one or more contractors may be notified of the updated basket of goods information and be provided with a link to update their own pricing for the updated basket(s) of goods (step 528). If the contractor does not update their associated pricing for that now-updated basket of goods, then any match between an estimate and that contractor's pricing for the now-updated basket of goods may be identified as un-verified until such time as the contractor either updates their pricing or the contractor identifies a willingness to honor their previous pricing (e.g., by accepting a project under their old pricing).

Thereafter, or if the query of step 524 is answered negatively, the method proceeds to allow the matching system 116 to use the updated basket of goods information for translation and/or matching purposes (step 532). In particular, the translation engine 144 may use the updated basket of goods information to translate estimate attributes 304 into contractor attributes 308 or vice versa. The matching engine 148 may use the updated pricing from the contractors as part of determining whether a contractor is qualified to handle a particular project or work item.

Figure 6:
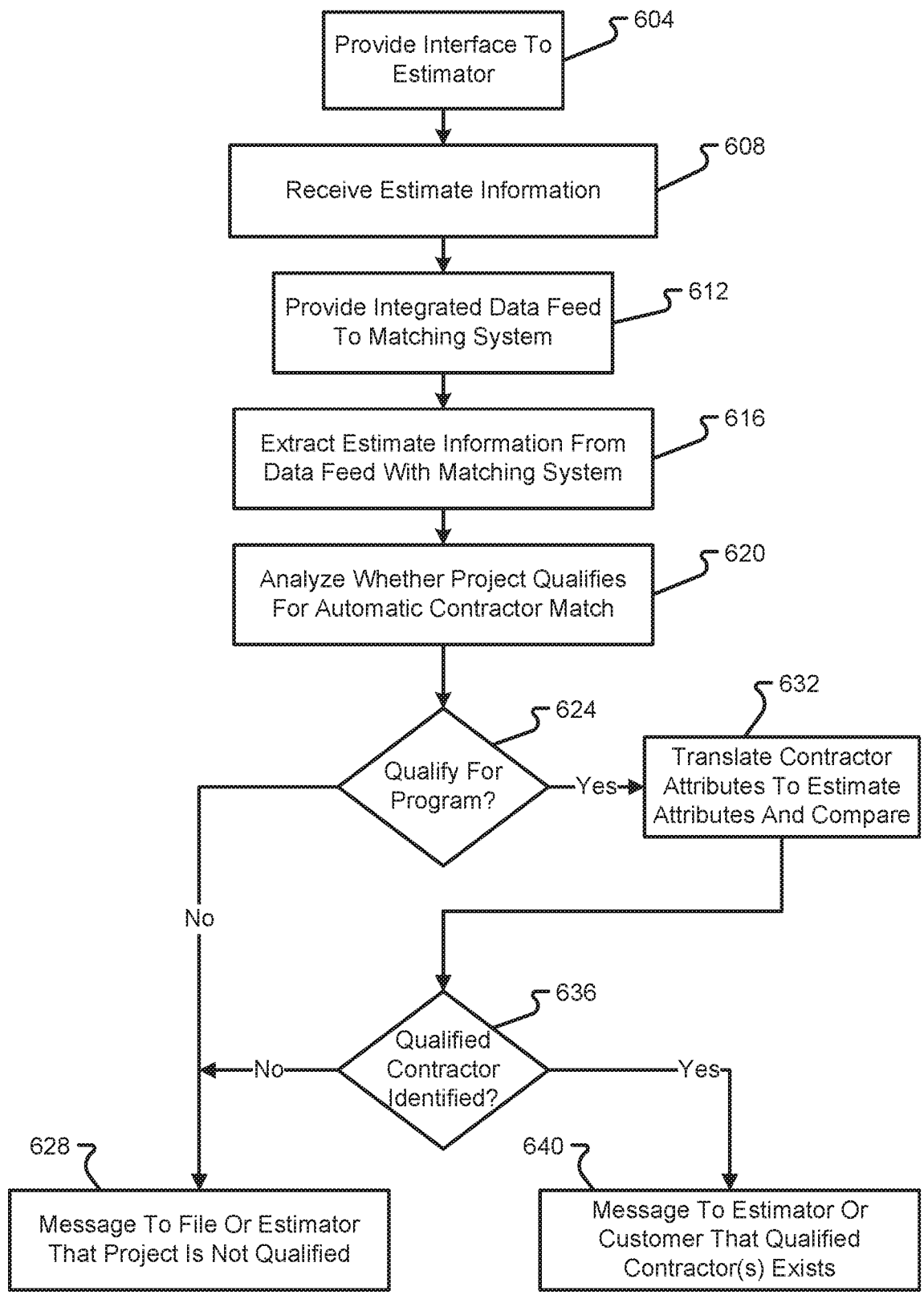
FIG. 6 is a flow diagram depicting a method of operating a matching system in accordance with at least some embodiments of the present disclosure.

With reference now to FIG. 6, details of a method for operating a matching system 116 will be described in accordance with at least some embodiments of the present disclosure. The method begins by providing an interface 128, 140 to an estimator's communication device 108 (step 604). Via the interface 128, 140, the estimator will be able to provide estimate information or attributes to either the estimating system 112 or matching system 116 so that estimate attributes 304 can be updated in connection with the work item or project being estimated or adjusted by the estimator (step 608). This information can be included into the estimate attributes 304 as one or more data sets 312 with an appropriate job identifier and associated attributes.

The information from the estimate can be provided as an integrated data feed directly to the matching system 116 or through the estimate attributes database 120 (step 612). The matching system 116 may utilize the attribute translation engine 144 to extract the estimate information from the integrated data feed or database 120 (step 616). The extracted estimate information may then be translated to a common language or attribute structure (e.g., price per square) as the contractor attributes 308.

This translation enables the matching engine 148 to analyze the project and determine whether the project itself qualifies for an automatic contractor match (step 620). Projects that may not be eligible for this automated matching process include, without limitations, projects with an estimate exceeding a predetermined total value, projects with a ratio of non-standard items to standard items exceeding a predetermined amount, projects in particular areas or regions, projects outside of particular areas or regions, projects that have been estimated by a non-member estimator, etc.

If the project itself does not qualify for the automated matching program (as determined in step 624), then the estimator, carrier, and/or customer are provided with one or more messages indicating that the project did not qualify for the matching program (step 628).

If, however, the project is identified as qualifying for the automated matching program, then the method continues by allowing the translation engine 144 to translate the contractor attributes 308 and/or the estimate attributes 304 into a common format or language such that the attributes can be compared to one another (step 632). Based on this comparison, the matching engine 148 determines whether any qualified contractor(s) are identifiable within the contractor database 124 (step 636). If so, then one or more messages are provided to the estimator, customer, carrier, and/or contractor to indicate the existence of a qualified contractor for the project (step 640). On the other hand, if there are no qualified contractors, then the method proceeds to step 628 to provide adequate messaging to one or more of the customer, carrier, estimator, and/or contractors that service the area in which the project is located.

Figure 7:
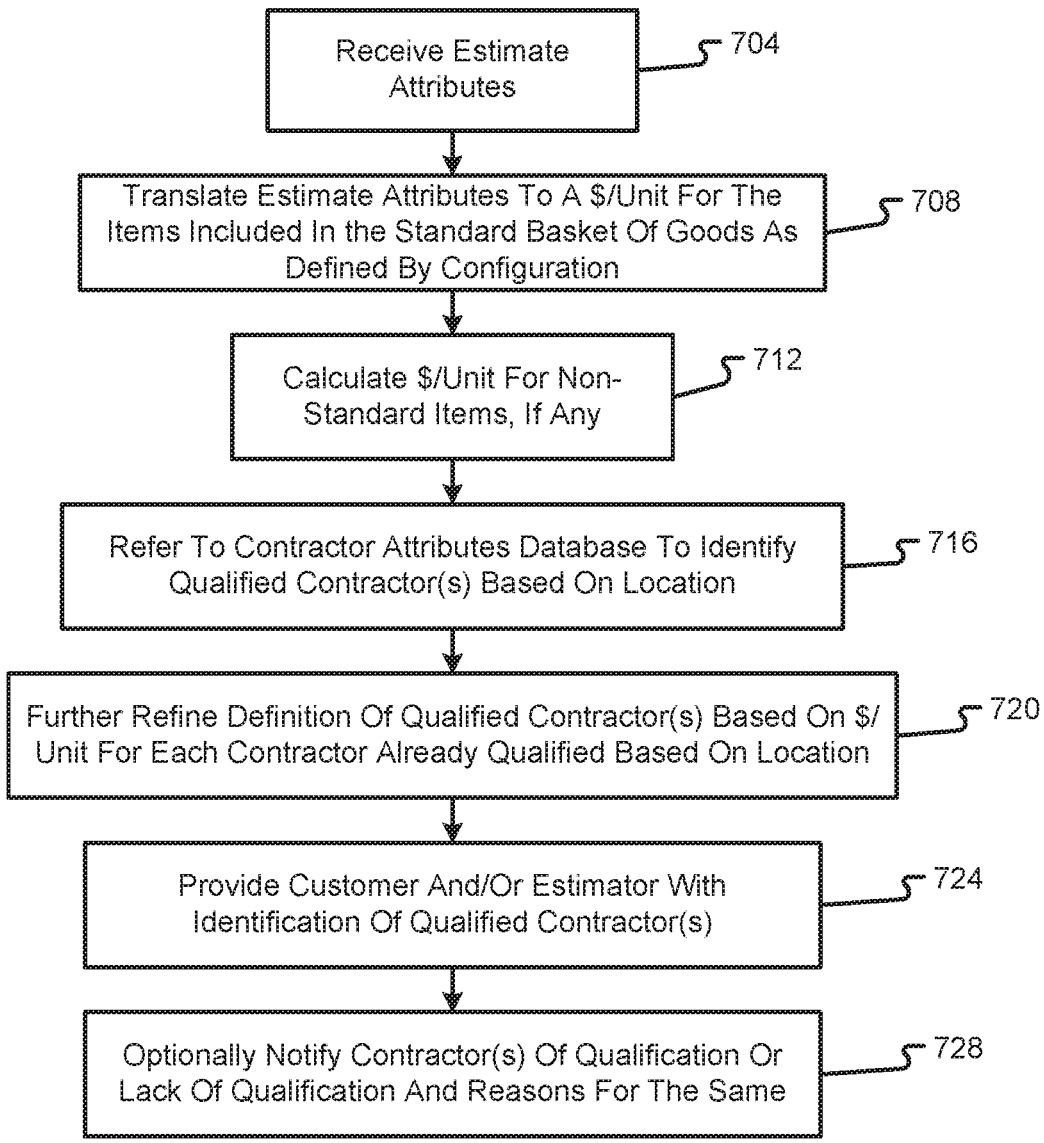
FIG. 7 is a flow diagram depicting a method of identifying qualified contractors for a project or job in accordance with at least some embodiments of the present disclosure.

With reference now to FIG. 7, a method of identifying qualified contractors for a project or job will be described in accordance with at least some embodiments of the present disclosure. The method begins when estimate attributes 304 are received for a particular job (step 704). The estimate attributes 304 may be received at the matching system 116 which translates the estimate attributes to a price per square unit for the job (e.g., the identified basket of goods) (step 708). The matching system 116 may further calculate the price per unit for any non-standard items identified in the estimate (step 712).

The matching system 116 then refers to the contractor attributes 308 in the contractor attribute database 124 to identify one or more qualified contractor(s) based on location (step 716). The matching system 116 may further refine its definition of a qualified contractor based on the price per unit given by each contractor that has been qualified based on their location (step 720). This particular order of operations is helpful because it may be possible to eliminate many contractors from further considerations (and comparison processing) based simply on service area. This helps to increase the processing efficiency and speed of the matching system 116.

Based on the processing performed by the matching system 116, a list of qualified contractors 320 may be identified by the job. The matching system 116 may provide the customer, estimator, and/or carrier with the list of the qualified contractors 320 via a match report 324 or the like (step 724). Optionally, the contractor(s), whether qualified or non-qualified, may be notified of their inclusion to or exclusion from the list of qualified contractors for the job (step 728). This notification may be provided by including the match report 324 as an attachment to an email, by sending information about the job via SMS or MMS message, or via some other communication modality.

While illustrative embodiments of the disclosure have been described in detail herein, it is to be understood that the inventive concepts may be otherwise variously embodied and employed, and that the appended claims are intended to be construed to include such variations, except as limited by the prior art.

Moreover, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the description.

What is claimed is:
1. A communication system, comprising:
an estimating system that includes:

an estimator interface, the estimator interface providing a communication device with information related to a description of materials and services required to complete a work item of a plurality of work items and further receiving, from the communication device, attributes associated with the description of materials and services required to complete the work item; and an estimate attribute builder that receives the attributes associated with the description of materials and services required to complete the work item and creates estimate attributes for the description of materials and services required to complete the work item; and a matching system that includes:

a contractor interface, the contractor interface providing a plurality of contractor communication devices with information related to the plurality of work items and further receiving, from the plurality of communication devices, a plurality of contractor's pricings for the plurality of work items on an averaged basis, wherein each of the contractor's pricings for the plurality of work items is updateable at any time by each of the plurality of communication devices, wherein each of the plurality of contractor's pricing for the plurality of work items comprises an estimated cost of material and an estimated cost of labor;

an attribute translation engine that translates the attributes associated with the description of materials and services required to complete the work item to an averaged price that is capable of being compared with the plurality of contractor's pricing for the plurality of work items;

a matching engine that compares the translated estimate attributes with the plurality of contractor's pricing for the plurality of work items to determine one or more contractors of the plurality of contractors qualifies to perform the work item by determining the one or more contractors meet a performance requirement and a price requirement based on the received plurality of contractor's pricings, wherein the plurality of contractor's pricings were received prior to the creation of the attributes associated with the description of materials and services required to complete the work item, wherein the attribute translation engine enables the matching engine to analyze the work item and determine that the work item qualifies for an automatic contractor match, and wherein the matching engine is configured to prioritize the one or more contractors for the work item based on each contractor's pricing received via the contractor interface, wherein the matching system automatically generates a match report including a list of the one or more contractors based on the prioritization; and a messaging engine that notifies at least one of the one or more contractors about the determination that the one or more contractors qualifies to perform the work item and automatically transmits the match report to the communication device in response to the received attributes associated with the description of materials and services required to complete the work item.

2. The communication system of claim 1, wherein the estimating system comprises a database interface that enables the estimate attribute builder to populate an estimate attributes database with the estimate attributes for the description of materials and services required to complete the work item.

3. The communication system of claim 2, wherein the matching system comprises a database interface that enables the matching system to retrieve the estimate attributes for the description of materials and services required to complete the work item from the estimate attributes database.

4. The communication system of claim 1, wherein the matching system receives the estimate attributes for the description of materials and services required to complete the work item as an integrated data feed and wherein the matching system extracts estimate information from the integrated data feed.

5. The communication system of claim 1, wherein the matching system comprises a database interface that enables the matching system to provide data to and receive data from a contractor attributes database.

6. The communication system of claim 5, wherein the contractor attributes database comprises a plurality of data sets that include contractor pricing on an averaged basis and wherein each of the plurality of the data sets are associated with a particular work item.

7. The communication system of claim 6, wherein each work item of the plurality of work items for which a contractor provides pricing on an averaged basis is delineated within the contractor attributes database based on a primary material used for the work item and wherein the prioritization of the one or more contractors is based, at least in part, on a number of times that a contractor updates their pricing.

8. The communication system of claim 7, wherein the primary material corresponds to a roofing material.

9. The communication system of claim 1, wherein the messaging engine provides a matching report as an attachment to an electronic message via a communication network.

10. A matching system that enables an automated matching between a work item of a plurality of work items based on estimate attributes and one or more contractors based on contractor attributes, the matching system comprising:

a contractor interface, the contractor interface providing a plurality of contractor communication devices with information related to a description of materials and services required to complete the work item and further receiving, from the plurality of communication devices, a plurality of contractor's pricings for the plurality of work items on an averaged basis, wherein each of the contractor's pricings for the plurality of work items is updateable at any time by each of the plurality of communication devices, wherein each of the plurality of contractor's pricing for the plurality of work items comprises an estimated cost of material and an estimated cost of labor;

an attribute translation engine that translates attributes provided by a communication device associated with an estimator for the work items to an averaged price that is capable of being compared with the plurality of contractor's pricing for the work items;

a matching engine that compares the translated estimate attributes with the plurality of contractor's pricing for the work items to determine one or more qualifying contractors of the plurality of contractors is qualified to perform the work item by determining the one or more contractors meet a performance requirement and a price requirement based on the received plurality of contractor's pricings, wherein the plurality of contractor's pricings were received prior to the creation of the attributes associated with the description of materials and services required to complete the work item, wherein the attribute translation engine enables the matching engine to analyze the work item and determine that the work item qualifies for an automatic contractor match, and wherein the matching engine is configured to prioritize the one or more contractors for the work item based on each contractor's pricing received via the contractor interface;

wherein the matching system automatically generates a match report including a list of the one or more contractors based on the prioritization; and a messaging engine that notifies at least one of the one or more contractors about the determination that the one or more contractors qualifies to perform the work item and automatically transmits the prioritization of each qualifying contractor to the communication device associated with an estimator in response to the provided estimate attributes.

11. The matching system of claim 10, further comprising a database interface that enables the matching system to retrieve the estimate attributes for the work item from an estimate attributes database.

12. The matching system of claim 11, wherein the database interface further enables the matching system to provide contractor attribute data to and receive contractor attribute data from a contractor attributes database.

13. The matching system of claim 12, wherein the contractor attributes database comprises a plurality of data sets that include contractor pricing on an averaged basis and wherein each of the plurality of the data sets are associated with a particular work item.

14. The matching system of claim 13, wherein each of the work items for which a contractor provides pricing on an averaged basis are delineated within the contractor attributes database based on a primary material used for the work item.

15. The matching system of claim 14, wherein the primary material corresponds to a roofing material.

16. The matching system of claim 10, wherein the messaging engine provides a matching report as an attachment to an electronic message via a communication network.

17. A server for use in a communication system, the server comprising:
a microprocessor;
computer memory including instructions stored thereon that are executable by the microprocessor, the instructions including:
a client interface that provides a plurality of contractor communication devices with information related to a description of materials and services required to complete a work item of a plurality of work items and further receives, from the plurality of communication devices, a plurality of contractor's pricings for the plurality of work items on an averaged basis, wherein each of the contractor's pricings for the plurality of work items is updateable at any time by each of the plurality of communication devices, wherein each of the plurality of contractor's pricing for the plurality of work items comprises an estimated cost of material and an estimated cost of labor;

an attribute translation engine that translates attributes provided by a communication device associated with an estimator for the description of materials and services required to complete the work item to an averaged price that is capable of being compared with the plurality of contractor's pricing for the work items;

a matching engine that compares the translated estimate attributes with the plurality of contractor's pricing for the work items to determine one or more contractors of the plurality of contractors is qualified to perform the work item, wherein the attribute translation engine also enables the matching engine to analyze the work item by determining the one or more contractors meet a performance requirement and a price requirement based on the received plurality of contractor's pricings, wherein the plurality of contractor's pricings were received prior to the creation of the attributes associated with the description of materials and services required to complete the work item, and determine that the work item qualifies for an automatic contractor match, and wherein the matching engine prioritizes the one or more contractors for the work item based on each contractor's pricing received via the client interface;

wherein the matching system automatically generates a match report including a list of the one or more contractors based on the prioritization; and a messaging engine that notifies at least one of the one or more contractors about the determination that the one or more contractors qualifies to perform the work item and automatically transmits the prioritization of each qualifying contractor to the communication device associated with the estimator in response to the provided estimate attributes.

18. The server of claim 17, further comprising a database interface that enables the matching system to retrieve the estimate attributes for the description of materials and services required to complete the work item from an estimate attributes database, wherein the database interface further enables the matching system to provide contractor attribute data to and receive contractor attribute data from a contractor attributes database.

19. The server of claim 18, wherein the contractor attributes database comprises a plurality of data sets that include contractor pricing on an averaged basis and wherein each of the plurality of the data sets are associated with a particular work item.

20. The server of claim 19, wherein each of the work items for which a contractor provides pricing on an averaged basis are delineated within the contractor attributes database based on a primary material used for the work item and wherein the primary material corresponds to a roofing material.

* * * * *